United States Patent [19]
de Brabander-van den Berg et al.

[11] Patent Number: 5,998,565
[45] Date of Patent: Dec. 7, 1999

[54] COMPOSITION COMPRISING A PLASTIC AND AN ADDITIVE

[75] Inventors: Ellen Marleen M. de Brabander-van den Berg, Schinnen; Peter Ernst Froehling, Sittard; Sandra Stevelmans; Jan C. M. Van Hest, both of Eindhoven, all of Netherlands

[73] Assignee: DSM N.V., Heerlen, Netherlands

[21] Appl. No.: 09/087,276

[22] Filed: May 28, 1998

Related U.S. Application Data

[63] Continuation of application No. PCT/NL96/00451, Nov. 15, 1996.

[30] Foreign Application Priority Data

Nov. 28, 1995 [NL] Netherlands ............... 1001753

[51] Int. Cl.$^6$ .................................................. C08G 63/00
[52] U.S. Cl. .................... 528/176; 528/271; 528/272
[58] Field of Search .................... 528/176, 271, 528/272

[56] References Cited

U.S. PATENT DOCUMENTS

| | | | |
|---|---|---|---|
| 5,530,092 | 6/1996 | Meijer et al. | 424/486 |
| 5,610,268 | 3/1997 | Meijer et al. | 528/363 |
| 5,698,662 | 12/1997 | Stoelwinder et al. | 528/363 |
| 5,788,989 | 8/1998 | Jansen et al. | 528/363 |

FOREIGN PATENT DOCUMENTS

| | | |
|---|---|---|
| 542 369 | 5/1993 | European Pat. Off. . |
| 88 01180 | 2/1988 | WIPO . |
| 94 17130 | 8/1994 | WIPO . |

OTHER PUBLICATIONS

Frechet, et al., "Self–Condensing Vinyl Polymerization: An Approach to Dendritic Materials", Science, vol. 269, Aug. 25, 1995, pp. 1080–1083.

B. Broadhead, et al., "Variation of Shrinkage in Commodity Plastics Resulting from the Addition of Colorants", Soc. of Plastics Engineers Conference Proceedings, 1993, pp. 429–432.

Primary Examiner—Terressa Mosley
Attorney, Agent, or Firm—Pillsbury Madison & Sutro LLP

[57] ABSTRACT

The invention relates to a composition comprising a plastic and an additive, the additive being present in a dendrimer having functional end groups, said functional end groups being provided, at least in part, with a modifying group, which modifying group is compatible with the plastic. The additive remains trapped in the dendrimer and, owing to the presence of the modifying group on the dendrimer, cannot migrate or bleed from the plastic.

18 Claims, No Drawings

COMPOSITION COMPRISING A PLASTIC AND AN ADDITIVE

This is a continuation of International Appln. No. PCT/NL96/00451 filed Nov. 15, 1996 which designated the U.S.

The invention relates to a composition comprising a plastic and an additive.

It is very common practice for plastics to be admixed with additives. These additives may, for example, serve to improve the UV stability and/or thermal stability or the workability; it is also readily possible to modify and/or improve the appearance of the plastics by adding one or more dyes and/or pigments. A drawback of adding additives to a plastic is, however, that the additives may adversely affect properties of the plastic.

Thus, for example, the article "Variation of shrinkage in commodity plastics resulting from the addition of colorants", by B. Broadhead and P. Koch, Soc. of Plastics Engineers Conference Proceedings, 1993, pp. 429–432 discloses that if pigments are used, the mechanical characteristics of the plastic are adversely affected. The article describes how the linear and transverse shrinkage may differ as a result of added pigments. This may easily lead to warping of injection-moulded articles. An additional drawback of the use of pigments is that it is not possible to obtain plastics which are transparently coloured. "Thermoplastic Polymer Additives", J. Lutz Jr., ed., New York 1989, pp. 71–73 shows that the use of dyes may give rise to problems which can be ascribed to poor miscibility of the dye with the plastic. Examples are migration or bleeding.

The term dye here and hereinafter refers to those colour additives which are molecularly miscible in a suitable plastic. This is in contrast to pigments, which are colour additives which are not molecularly miscible with a plastic.

Many additives are polar compounds. Once they have been blended into apolar plastics, the difference in polarity often leads to migration and bleeding of the additive. As a result, the resistance and/or durability of the plastic may be limited. In the case of the bleeding of additives, use of the plastic in, for example, packaging for food or in toys is virtually precluded.

The object of the invention is to provide a composition in which the additive is blended into the plastic in such a way that the additive does not adversely affect the characteristics of the plastic and/or that the additive is not subject to bleeding.

This object is achieved as a resulting of the additive being present in a dendrimer having functional end groups, said functional end groups being provided, at least in part, with a modifying group, which modifying group is compatible with the plastic. This also ensures that in many cases less additive is necessary to achieve the same effect and that the choice of additives becomes much wider, now that it is unnecessary to take the compatibility of additive and plastic into account. A result of this wider choice is that it is now also possible to obtain products in fluorescent colours and/or transparently coloured products, made of plastics with which this has hitherto been impossible. Products which have been obtained by making use of a composition of plastic and dye according to the invention are often coloured more beautifully: the colours are brighter and more intense, and frequently a more beautiful gloss effect is also achieved. It has further been found that, for example, dyes themselves have a higher UV resistance if they are present in a dendrimer than if they are present as such.

Within the scope of the invention, the term dendrimers refers to three-dimensional, highly branched oligomeric or polymeric molecules. The dendrimers according to the invention may comprise a core, a number of branching generations and an external surface composed of end groups. A branching generation is composed of structural units which are bound radially to the core or to the structural units of a previous generation and which extend outwards. The structural units have at least two monofunctional groups and/or at least one monofunctional group and one multifunctional group. The term multifunctional is understood as having a functionality of 2 or higher. To each functionality, a new structural unit may be linked, a higher branching generation being produced as a result. The structural units may either be the same (they are repeated, therefore) for each successive generation, or they may be different. Dendrimers can be characterized, inter alia, on the basis of a degree of branching. The term degree of branching of a dendrimer of a particular generation is understood, here and hereinafter, as the ratio between the number of branchings present and the maximum possible number of branchings in a completely branched dendrimer of the same generation. The term functional end groups of a dendrimer refers to those reactive groups which form part of the external surface. The branchings may occur with greater or lesser regularity. Whilst it is possible, in the dendrimers which can be used within the scope of the invention, for the branchings at the external surface of the dendrimer all to be of the same generation, it is also possible for the branchings at the surface to be of different generations. The latter may be the case, for example, if the synthesis of the dendrimers proceeds in a less controlled manner.

The term dendrimers is also understood, according to the invention, as dendrimers having defects in the branching structure, dendrimers having an incomplete degree of branching, asymmetrically branched dendrimers, star polymers, highly branched polymers, highly branched copolymers and/or block copolymers of highly branched and not highly branched polymers.

Owing to the three-dimensional structure of the dendrimer, cavities are present between the branchings. The shape and the dimensions of these cavities vary with the generation, with the composition of the structural units and with the degree of branching. During the preparation of the dendrimer it is possible to influence the degree of branching, the shape and the dimensions of the cavities between the branchings in order to enable the incorporation of additives of various dimensions into the cavities. This can be achieved, inter alia, by varying, for example, the composition of the structural units, by varying the molecular weight of the structural units, by increasing or decreasing the degree of branching, or by perturbing the regularity in the configuration of the branchings.

In principle, all dendrimers having functional end groups can be considered for use according to the invention. The best results are often achieved either with perfectly branched dendrimers or with highly branched polymers or highly branched copolymers. The term perfectly branched dendrimers refers to those dendrimers in which, in each generation, at least 95%, preferably 99% of the functionality of the functional groups in the structural units has reacted with a functional group of a structural unit of the next generation.

The number of functional end groups of a dendrimer which is provided with a modifying group according to the invention generally varies according to the type and generation of the dendrimer used and the type and dimensions of the modifying group. Preferably, dendrimers are used in which at least 30% of the functional end groups of the dendrimer are provided with a modifying group, more preferably at least 50%, even more preferably at least 70% and most preferably at least 90%.

Dendrimers suitable within the scope of the invention are dendrimers based on, for example, a polyester, polyether, polythioether, polyamide, polyetherketone, polyalkylene imine, polyamido amine, polyether amide, polyarylene, polyalkylene, aromatic polyalkylene, polyaryl acetylene and/or a phosphorus-or silicon-containing dendrimer, or a combination thereof. Preferably, use is made of a dendrimer based on polyalkylene imine or polyamido amine. It is also possible to employ a highly branched polyester, for example a polyester prepared from 2,2-di(hydroxymethyl)propan-1-oic acid.

If those dendrimers according to the invention are used in which branching generations can be designated, use is preferably made of dendrimers of the 3rd or higher generation, more preferably of the 4th or higher generation and most preferably of the 5th or higher generation.

Within the scope of the invention, a compound which contains at least one reactive group which can enter into a chemical bond with the functional end groups of a dendrimer, is called a modifying compound. That part of the modifying compound which, after the reaction, remains attached to the dendrimer is here and hereinafter referred to as the modifying group. In the course of the reaction between reactive group and functional end group, molecules may be eliminated. The modifying group can be both polar and apolar. The modifying group can be bound to the dendrimer in various ways, for example via a covalent bond, via a hydrogen bridge or via an ionogenic bond.

If the plastic is apolar, an apolar group is chosen as a modifying group. If the plastic is polar, a polar group is chosen as the modifying group.

The choice of the type of modifying compound which is used to attach the modifying group will largely be determined by the reactivity of the modifying compound with respect to the functional end group of the dendrimer. Preferably, a compound is chosen which enters into as complete a reaction as possible with the functional end group(s) of the dendrimer.

Suitable modifying compounds for attaching, within the scope of the invention, apolar groups to the functional end groups of the dendrimer are, for example, aliphatic halides, aliphatic alcohols, phenols, aliphatic and aromatic carboxylic acids, fatty acids, esters of aliphatic carboxylic acids and aromatic or aliphatic alcohols, esters of aromatic carboxylic acids and aromatic or aliphatic alcohols, aliphatic epoxides, aliphatic isocyanates, aliphatic amides, completely or incompletely fluorinated aliphatic compounds, sulphonic acids and derivatives of sulphonic acids, phosphorus-containing compounds or silicon-containing compounds. Mixtures of such compounds are likewise suitable for use within the scope of the invention. Preferably, use is made of a compound by which, after reaction with the functional end group of the dendrimer, a fatty acid remainder is left behind as a modifying group.

The above-mentioned aliphatic compounds are substituted or unsubstituted alkanes, singly or multiply unsaturated alkenes or singly or multiply unsaturated alkynes and their cyclic analogues. The above-mentioned aromatic compounds are substituted or unsubstituted benzene compounds and those compounds whose chemical behaviour is similar to that of benzene.

Within the scope of the invention, the term fatty acid refers to an aliphatic monocarboxylic acid having 1–60 C atoms. Examples of compounds by which a fatty acid remainder is left behind after the reaction are alcohols which are derived from a fatty acid, amines which are derived from a fatty acid, isocyanates corresponding to a fatty acid, epoxides corresponding to a fatty acid, halides corresponding to a fatty acid and/or saturated or (singly or multiply) unsaturated fatty acids. Examples are stearyl alcohol, dodecylphenol, 4,4,5,5,5-pentafluoro-n-pentan-1-ol, stearamide, palmityl isocyanate, palmitoyl chloride, stearoyl chloride, pentafluoropropionyl chloride, lauric acid, myristic acid, palmitic acid, stearic acid, perfluorononanoic acid, abietic acid, cholic acid and the mixture of alkane carboxylic acids known as "Montanwachs". More preferably, use is made of a saturated or (singly or multiply) unsaturated fatty acid.

As modifying compound by which a fatty acid remainder is left behind as modifying group after the reaction with the functional end group of the dendrimer, use is preferably made of a compound which comprises an aliphatic group having 6–50 C atoms. More preferably, use is made of a compound by which a fatty acid remainder having 12–30 C atoms is left behind, and most preferably use is made of a compound by which a fatty acid remainder having 16–20 C atoms is left behind.

Other suitable compounds for attaching apolar groups to the functional end groups of the dendrimer are oligo- and/or polymer chains which are compatible with the plastic matrix into which the dendrimer is to be blended.

Suitable modifying compounds for attaching polar groups to the functional end groups of the dendrimer are, for example, polyacrylates, polymethacrylates, polyvinyl alcohols, polyvinyl esters, polyvinyl ethers, poly-urethanes, polyurea, polyisocyanates, polyvinyl pyridines, polyvinyl pyrrolidones, polyethylene glycols, polyethylene imines, polycarbonates, polycaprolactones, nylons, styrene-acrylonitrile copolymers (SAN), styrene-maleic anhydride copolymers (SMA), polyphenylene oxides (PPO), Jeff amines, telechelics of polyesters, copolymers of alkenes with carbon monoxide, copolymers of styrene, polymers of acrylic acid, and polymers of methacrylic acid.

The modifying groups may, if desired, undergo a further reaction after they have been attached to the functional end group of the dendrimer. An example of such a reaction is cross-linking.

The time at which the modifying group is attached to the functional end groups of the dendrimer is not critical. The modifying group may be attached before the additive is taken up by the dendrimer, but the modifying group may also be attached at the same time as the additive is taken up or after this has happened.

The preparation of dendrimers having a regular configuration can take place via a divergent method in which successive generations of dendrimer molecules are obtained by repeated reaction sequences starting from a multifunctional core, the branchings being introduced systematically. Such a method is described, for example, in NL-A-9200043. It is also possible, via a convergent method, first to synthesize regularly branched segments and to link these, in a final step, to a multifunctional core. Furthermore, it is possible to employ combinations of convergent and divergent methods.

The preparation of dendrimers having a less regular configuration may, for example, take place via polycondensation, ring opening polymerization, addition polymerization or combinations thereof.

Another option for the preparation of highly branched polymers is the free-radical or anionic or cationic chain polymerization of monomers of the type AB, where A is a vinyl group and B is a group which is activated via an initiation customary for chain polymerization. A polymerization of this type is described, for example, in J. M. J. Fréchet, Science 269 (1995), pp. 1080–1083.

Another option for the preparation of a highly branched polymer is the cationic polymerization of, for example, ethylene imine. The highly branched polymer formed in this case carries many reactive functional end groups.

The additives which are present in the dendrimer may be bound to the dendrimer via various types of interactions. It is also possible for the additives to be physically trapped in the cavities or for them to be present between the modifying groups.

The additives may enter into an interaction with groups which are present in the dendrimer. This phenomenon may occur, for example, in the case of dyes which as a result of interaction with groups in the dendrimer produce a different colour in the plastic than in the "free" form. If the interaction is undesirable, use can be made of a different type of dendrimer or of a different additive which has the same effect.

Additives which can be present in the dendrimer are, for example, lubricants, antistatics, plasticizers, deactivators, processing aids, fillers, adhesives, odourants, flame-retardants, flameproofing agents and catalysts. It is also possible to use, for example, agricultural chemicals, insecticide or pheromones. Preferably, a peroxide, an antioxidant, a UV stabilizer or a thermal stabilizer is present as an additive in the dendrimer, and more preferably, a dye is present in the dendrimer. Combinations of more than one type of additive in a dendrimer may likewise be present in a plastic. This provides the option of either different additives in one dendrimer being present or of different additives in different dendrimers being present (one type of additive per type of dendrimer).

Examples of suitable types of dyes as an additive are, for example, azo, azine, perinone, anthraquinone, xanthene, phthalocyanine, triarylmethane, indophenol, coumarin and diazomethine dyes. Mixtures of dyes are likewise suitable. Criteria in the choice of the dye are, for example, the desired colour and the thermal and UV stability of the dye.

Examples of suitable antioxidants as an additive are 2,6-di-t-butyl-4-methylphenol, octadecyl 3-(3,5-di-t-butyl-4-hydroxyphenyl)propionate, pentaerythrityl tetrakis(3-(3, 5-di-t-butyl-4-hydroxyphenyl)propionate), tris-(2,4-di-t-butylphenyl) phosphite and distearyl thio-dipropionate.

Examples of suitable UV stabilizers as an additive are 2-hydroxy-4-n-octoxybenzophenone, 2-ethoxy-5-t-butyl-2'-ethyloxanilide, 2-(2'-hydroxy-3'-t-butyl-5'-methylphenyl)-5-chlorobenzotriazole, 2-(2'-hydroxy-3',5'-di-t-butylphenyl)-5-chlorobenzotriazole, di-(2,2,6,6-tetramethyl-4-piperidyl) sebacinate, oligomer of N-(2-hydroxyethyl)-2,2,6,6-tetramethyl-4-piperidinolenesuccinic acid, oligomer of cyanuric acid and N,N-di(2,2,6,6-tetramethyl-4-piperidyl)hexamethylenediamine and carbon black.

Suitable lubricants as an additive are, for example, oleamide and erucamide.

In some cases it may be desirable to allow additives to be released (in a controlled manner). This may, for example, take place by a change of temperature or under the influence of light.

The introduction of the additives into the dendrimer and the modification of the dendrimer can take place in various ways. One possible method is that in which, in a first step, the additives are introduced into the dendrimer, the modification then taking place in a second step. Another method comprises the modification, in a first step, of the dendrimer, the additives then being introduced into the modified dendrimer in a second step. Still another method is one in which additive and modifying group(s) are introduced simultaneously, in one and the same step.

The practical implementation of the method depends on the additive, on the functional end groups of the dendrimer, on the modifying compound and on the reaction between modifying compound and functional end group. To those skilled in the art it is easy to decide which method can best be used.

Use of the invention makes it possible for the additives to be blended into a variety of plastics. Thermoplastics, thermosetting plastics and rubbers are all eligible. The invention is suitable both for homo- and copolymers. Within the scope of the invention, the term copolymer refers to a polymer built up from at least two different monomers. The monomers can be either branched or nonbranched or cyclic. Both singly and multiply unsaturated monomers are eligible. Mixtures of polymers can likewise, as a result of use being made of the composition according to the invention, be provided with additives. Examples of suitable plastics are polyolefins, vinyl polymers, styrene polymers, acrylic polymers, fluorine-containing polymers, polyamides, polyalkylene terephthalates, polycarbonates, polyoxyalkylenes, polyimides, polybenzimidazoles, polyphenylene oxides, polyacrylonitriles, polyesters, phenol-formaldehydes, aminoplastics, polyesters, epoxy resins, polyurethanes, styrene-butadiene rubber, butyl rubber, chlorobutyl rubber, chloroprene rubber, nitrile rubber, butadiene rubber, isoprene rubber, ethylene-propylene rubbers (EPM, ethylene-propylene rubber and EPDM, ethylene-propylene-diene rubber), silicone rubbers, urethane rubbers, acrylate rubbers, fluorine-containing rubbers and/or cyclopentene rubbers. Preferably, use is made of polyolefin homo- or copolymers. More preferably, use is made of polyethylene, polypropylene, EPM and/or EPDM rubbers. More preferably use is made of polyethylene and/or polypropylene.

The composition according to the invention can be used for many purposes, namely those where it is necessary or desirable to introduce an additive into a plastic. The composition according to the invention is preferably added to the plastic in the form of a "masterbatch". The product which has been produced from a composition according to the invention does not suffer any adverse effects from the additive, or the additive is not subject to bleeding. It is possible for both advantages to be achieved.

The invention will be explained with reference to the following examples without, however, being limited thereto.

EXAMPLES

In the following examples, polypropylene imine dendrimers are used. The preparation of this type of dendrimers is described in NL-A-9200043 and BE-A-9300702. Polypropylene imine dendrimers having terminal amine groups, in accordance with the above-mentioned applications, have 16 amine end groups in the 3rd generation, 32 amine end groups in the 4th generation and 64 amine end groups in the 5th generation.

Example I
Attaching a Modifying Group to a Dendrimer

To a solution of 0.54 g of a 5th generation polypropylene imine dendrimer having terminal amine groups (1 eq., 70.0 $\mu$mol) in 50 ml of tetrahydrofuran, 5.30 g of triethylamine and 1.36 g (1.1 eq, 77.0 $\mu$mol) of palmitoyl chloride were added. After 20 hours' stirring at room temperature the solvent was evaporated. The residue was taken up in 50 ml of diethyl ether and heated under reflux for half an hour, followed by filtration. The filtrate was added to a solution of 2 g of sodium carbonate in 50 ml of water. This mixture was heated under reflux for 6 hours. After filtration, the residue was boiled down in vacuo, 0.90 g of a pale brown solid being obtained, identified as the polypropylene imine dendrimer substituted with 64 palmitoyl groups.

Example II
Introduction of a Dye Into the Dendrimer 0.1009 g of the palmitoyl dendrimer derivative prepared according to Example I was dissolved in 10 ml of ethanol. To this solution, 0.2934 g of the dye Rose Bengal (Acid Red 94, C.I. 45440) was then added. This mixture was stirred at room temperature for 18 hours. Then the pink solution was precipitated in acetonitrile. The pink precipitate formed was washed with acetonitrile until the wash liquid remained colourless. The pink solid was dried in vacuo. Spectrometric analysis (absorption at 550 nm) showed that the product contained 2.2 molecules of dye per molecule of dendrimer.

Example III
Introduction of a Dye-Containing Dendrimer Into a Plastic 2.5 mg of the dye complex prepared according to Example II were blended with 25 g of polyethylene having a density of 946 kg/m$^3$ (Stamylan® 6621), this being effected in a laboratory kneader for 10 minutes at 200° C. At 190° C. the mixture was compression-moulded over a period of 3 minutes, with a force of 294 N, to produce a panel with a thickness of 1 mm. The panel obtained had a beautiful uniform pale-pink colour and did not show any inhomogeneities.

Comparative Experiment A
Blending a Dye Into a Plastic 1 mg of Rose Bengal was blended, in the same manner as in Example III, with polyethylene (Stamylan® 6621). To the naked eye, a panel compression-moulded in the same manner showed many inhomogeneities which consisted of non-dispersed dye particles.

Example IV
Simultaneous Introduction of a Modifying Group and a Dye Into a 4th Generation Dendrimer 3.78 g (1.08 mmol) of a 4th generation polypropylene imine dendrimer having terminal amine groups and 9.21 g of stearic acid were dissolved in 200 ml of boiling ethanol. A solution of 2.59 g of the copper phthalocyanine dye Solvent Blue 67 in 100 ml of ethanol was added dropwise to the boiling solution. After cooling a blue material precipitated. This was filtered off and washed with ethanol until the wash liquid remained colourless. This resulted in 12.0 g of a blue product which, according to the analysis, contained 0.78 wt % of copper. The starting dye contained 5.34 wt % of copper, from which it can be deduced that the precipitated product contained 2 molecules of dye per molecule of dendrimer.

Example V
Simultaneous Introduction of Modifying Group and Dye Into a 5th Generation Dendrimer The method of Example IV was repeated with 1.69 g of a 5th generation polypropylene imine dendrimer having terminal amine groups, 4.29 g of stearic acid and 1.22 g of Solvent Blue 67. This produced 5.05 g of blue product which contained 0.80 wt % of copper, corresponding to 4 molecules of dye per molecule of dendrimer.

Example VI
Simultaneous Introduction of a Modifying Group and a Dye Into a 3rd Generation Dendrimer 1.69 g (1 mmol) of a 3rd generation polypropylene imine dendrimer having terminal amine groups and 4.55 g of stearic acid (16 mmol) were dissolved in 200 ml of boiling toluene, to which 100 ml of a solution of 0.63 g of the anthraquinone dye Solvent Blue 68 (C.I. 61110) were then added. After cooling the solvent was removed in vacuo. The residue was, treated with ethanol until the wash liquid remained colourless. Spectroscopic analysis showed that the product contained about 4 molecules of dye per dendrimer molecule.

Example VII
Simultaneous Introduction of a Modifying Group and a Dye Into a 4th Generation Dendrimer The method of Example VI was repeated with 3.40 g of a 4th generation polypropylene imine dendrimer having terminal amine groups, 8.82 g of stearic acid and 0.61 g of Solvent Blue 68. This produced 3.83 g of product which contained 1.5 molecules of dye per molecule of dendrimer.

Example VIII
Simultaneous Introduction of a Modifying Group and a Dye Into a 5th Generation Dendrimer The method of Example VI was repeated with 3.48 g of a 5th generation polypropylene imine dendrimer having terminal amine groups, 8.84 g of stearic acid and 0.30 g of Solvent Blue 68. This produced 9.81 g of product which contained 5 molecules of dye per molecule of dendrimer.

Example IX
Introduction of a Dye Into a Highly Branched Polymer Having a High Molecular Weight 3.20 g of highly branched polyethylene imine having a molecular weight of 25,000 (Lupasol WF, BASF) and 10.56 g of stearic acid were dissolved in 200 ml of boiling ethanol, to which a solution of 1.00 g of Solvent Blue 68 in 100 ml of ethanol was then added. After washing with ethanol and drying, 8.68 g of a blue product were obtained which contained 5.44 wt % of dye.

Comparative Experiment B
Introduction of a Dye Into a Highly Branched Polymer Having a Low Molecular Weight The method of Example IX was repeated with 4.60 g of highly branched polyethylene imine having a molecular weight of 1300 (Lupasol G20, BASF), 15.18 g of stearic acid and 1.00 g of Solvent Blue 68. Upon cooling, a blue precipitate formed which after filtration lost virtually all of its colour upon washing with ethanol. This shows that polyethylene imine having a molecular weight of 1300 is unable to retain the dye Solvent Blue 68.

Example X
Introduction of a Dye-Containing Dendrimer Into a Plastic

In a laboratory kneader, 0.5 g of the product prepared according to Example VIII was kneaded for 10 minutes at a temperature of 200° C. with 35 g of polyethylene having a density of 946 kg/m$^3$ (Stamylan® 6621). The mixture was compression-moulded with a force of 294 N at a temperature of 190° C. to produce a film with a thickness of 0.1 mm. Upon examination by microscope at a magnification of 50–300× a uniformly blue material was observed. Immersion of the compression-moulded film into ethanol did not result in the ethanol turning blue. This shows that the dye is trapped in the dendrimer.

Comparative Experiment C
Blending a Dye Into a Plastic 35 mg of Solvent Blue 68 were blended with 35 g of polyethylene having a density of 946 kg/m³ (Stamylan® 6621) as described in Example X. When looked at by the naked eye, the film appeared homogeneously coloured, but examination by microscope with a magnification of 50–300× showed that the dye was present in the form of particles having a size of 10–50 micrometers in a virtually colourless matrix. This shows that the dye produces inhomogeneities in the plastic. Upon immersion of the compression-moulded film into ethanol, the ethanol acquired a pale blue colour within one hour. This demonstrates that the dye does not remain permanently in the plastic matrix.

Example XI
Attaching a Modifying Group to a Dendrimer 4.84 g of a fourth generation polypropylene imine dendrimer having terminal amine groups (corresponding to 44.0 milliequivalents of $NH_2$), 12.50 g of stearic acid (corresponding to 43.9 milliequivalents) and 20 ml of xylene were combined, stirred and heated under reflux to 180° C. After a few minutes the formation of water was observed. After half an hour water was no longer being formed. The still warm xylene solution was poured into 250 ml of methanol, a precipitate being formed in the process. The precipitate was filtered off, washed with methanol and dried in vacuo at 45° C. The yield was 12.8 g of a yellowish-white powder. Infrared and nuclear resonance spectra showed that all the amine groups of the dendrimer had been reacted with stearic acid to give amide. The product had a melting point of 82–83° C.

Example XII
Attaching a Modifying Group to a Dendrimer 10.56 g of a third generation polypropylene imine dendrimer having terminal amine groups (corresponding to 100.2 milliequivalents of $NH_2$) and 28.44 g of stearic acid (corresponding to 100.0 milliequivalents) were heated for one hour under reflux to 150° C. under reduced pressure (2.7 kPa). After cooling, a yellow-white solid was obtained which no longer contained any free stearic acid. The product had a melting point of 81–82° C.

Example XIII
Introduction of a Dye Into a Modified Dendrimer 5.4 g of the modified dendrimer according to Example XI were dissolved in 25 ml of boiling ethanol to which, via a dropping funnel, a solution of 0.39 g of the dye Solvent Blue 68 in 10 ml of ethanol was then added dropwise. Upon cooling a dark blue precipitate formed which was filtered off and then washed with 200 ml of ethanol. The product contained approximately 11 wt % of dye.

Example XIV
Introduction of a Dye Into a Modified Dendrimer 10.2 g of the dendrimer derivative according to Example XII were dissolved in 25 ml of boiling ethanol to which a solution of 0.5 g of the dye Solvent Red 230 in 15 ml of ethanol was then added dropwise. Upon cooling a dark red precipitate formed which was filtered off and then washed with 200 ml of ethanol. The product contained approximately 33 wt % of dye.

Example XV
Introduction of a Dye Into a Modified Dendrimer 9.2 g of the dendrimer derivative according to Example XII were dissolved in 25 ml of boiling ethanol to which a solution of 0.4 g of the dye Solvent Yellow 163 in 15 ml of ethanol was then added dropwise. Upon cooling an intensely yellow precipitate formed which was filtered off and then washed with 200 ml of ethanol. The product contained approximately 20 wt % of dye.

Example XVI
Introduction of a Dye-Containing Dendrimer Into a Plastic

The method as described in Example X was repeated with 0.5 g of the product prepared according to Example XIII and 40 g of polyethylene. This afforded a transparent film which had a beautifully homogeneous blue colour. Upon examination by microscopy, no inhomogeneities were observed. The dye did not migrate from the plastic.

Example XVII
Introduction of a Dye-Containing Dendrimer Into a Plastic

The method as described in Example X was repeated with 0.5 g of the product prepared according to Example XIV and 40 g of polyethylene. This afforded a transparent film which had a deeply dark ed colour. Upon examination by microscopy, no inhomogeneities were observed. The dye did not migrate from the plastic.

Example XVIII
Introduction of a Dye-Containing Dendrimer Into a Plastic

The method as described in Example X was repeated with 0.5 g of the product prepared according to Example XV and 40 g of polyethylene. This afforded a transparent film which had a fluorescent yellow colour. Upon examination by microscopy, no inhomogeneities were observed. The dye did not migrate from the plastic.

We claim:

1. A process for obtaining a melt-mixed composition comprising:

meltmixing a composition comprising a plastic and an additive present in a dendrimer, said dendrimer being selected from the class of dendrimers based on polyalkyleneimine or polyester, the dendrimer having functional end groups, said functional end groups being provided, at least in part, with a modifying group, which modifying group is compatible with the plastic.

2. A process according to claim 1, wherein the polyalkyleneimine dendrimer is a polypropyleneimine dendrimer.

3. A process according to any one of claims 1–2, wherein the dendrimer is of the $3^{rd}$ or of a higher generation.

4. A process according to any one of claims 1–2, wherein at least 50% of the end groups of the dendrimer are provided with a modifying group.

5. A process according to any one of claims 1–2, wherein the modifying group is a fatty acid remainder.

6. A process according to claim 5, wherein the fatty acid remainder contains 12–30 C atoms.

7. A process according to any one of claims 1–2, wherein the plastic is at least one polyolefin. homo- or copolymer.

8. A process according to claim 7, wherein the polyolefin is at least one of polyethylene or polypropylene.

9. A process according to any one of claims 1–2 wherein the additive is a dye.

10. A process according to claim 3, wherein at least 50% of the end groups of the dendrimer are provided with a modifying group.

11. A process according to claim 10, wherein the modifying group is a remainder of a fatty acid.

12. A process according to claim 11, wherein the remainder contains 12–30 carbon atoms.

13. A process according to claim 2, wherein the plastic comprises a polyolefin homo- or copolymer.

14. A process according to claim 13, wherein the polyolefin comprises at least one of polyethylene or polypropylene.

15. A process according to claim 1 or 2, wherein the additive comprises a dye.

16. A process according to claim 1, wherein said dendrimer is a polyalkyleneimine dendrimer, the additive comprises a dye, the modifying group is a remainder of a fatty acid, and the plastic comprises at least one polyolefin homo- or copolymer.

17. A process according to claim 1, wherein the dendrimer is a dendrimer based on polyester.

18. A composition obtained by a process according to any one of claims 1, 2, 16 or 17.

* * * * *